United States Patent [19]

Yamashita

[11] Patent Number: 4,862,223

[45] Date of Patent: Aug. 29, 1989

[54] PROCESS CAMERA FOR REPRODUCING MULTIPLE IMAGES ON SINGLE FILM

[75] Inventor: Miyuki Yamashita, Tokyo, Japan

[73] Assignees: Mitsubishi Paper Mills Limited; Hirakawa Kogyosha Co., Ltd., both of Tokyo, Japan

[21] Appl. No.: 206,843

[22] Filed: Jun. 15, 1988

[30] Foreign Application Priority Data

Jun. 18, 1987 [JP] Japan .................. 62-151753
Jun. 18, 1987 [JP] Japan .................. 62-151754
Jun. 18, 1987 [JP] Japan .............. 62-93665[U]

[51] Int. Cl.$^4$ ............................................. G03B 27/44
[52] U.S. Cl. ...................................... 355/54; 355/40; 355/45
[58] Field of Search .................. 355/18, 40, 45, 53, 355/54, 76

[56] References Cited

U.S. PATENT DOCUMENTS

| 3,315,561 | 4/1967 | Boutigue | 355/45 X |
|---|---|---|---|
| 3,834,811 | 9/1974 | Rathburn | 355/18 |
| 3,837,742 | 9/1974 | Watty | 355/53 X |
| 3,850,522 | 11/1974 | Vane et al. | 355/54 |
| 3,920,333 | 11/1975 | Wally | 355/76 |
| 3,998,546 | 12/1976 | Wally et al. | 355/18 X |
| 4,229,098 | 10/1980 | Schmoker | 355/18 X |
| 4,602,866 | 7/1986 | Sakata et al. | 355/45 X |

FOREIGN PATENT DOCUMENTS 2154063 5/1973 Fed. Rep. of Germany .
3019559 12/1980 Fed. Rep. of Germany .
495566 10/1970 Switzerland .

Primary Examiner—Richard A. Wintercorn
Attorney, Agent, or Firm—Cushman, Darby & Cushman

[57] ABSTRACT

A reverse mirror for reversing an image is disposed between a subject holder and an object lens. The reverse mirror and the object lens are moved for varying image magnification and focusing the image. A movable mirror disposed between the object lens and a platen can selectively establish a focusing optical system for focusing the image of an original on the platen, a focusing optical system for focusing the image of the original on an index plate, and a focusing optical system for focusing the image of the index plate on the original plate. After a prescribed number of originals have been photographed on a photosensitive member, the platen and mask plates are moved to predetermined positions to photograph marks necessary for cutting and bookbinding in non-image areas on the photosensitive member.

8 Claims, 11 Drawing Sheets

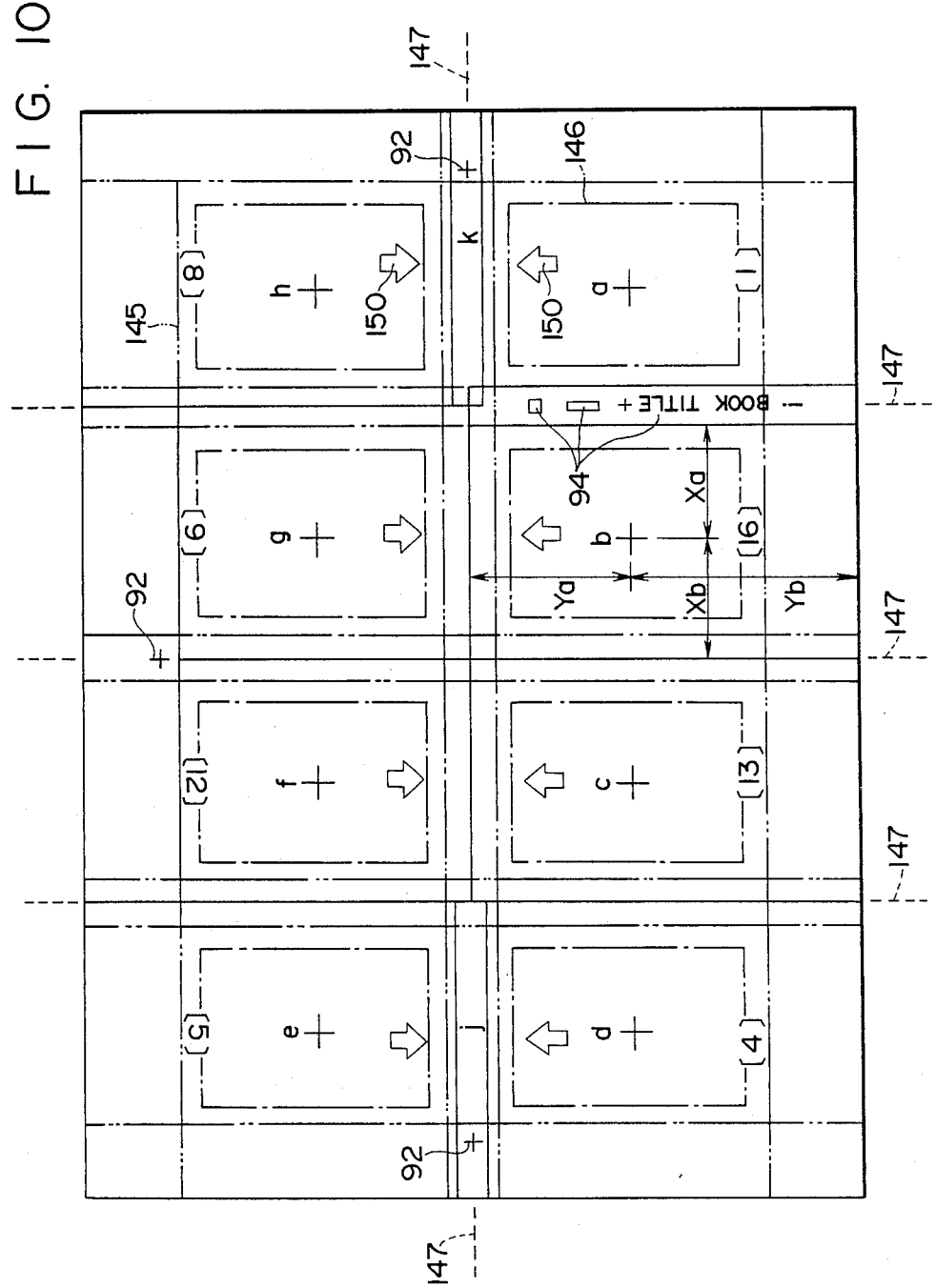

PROCESS CAMERA FOR REPRODUCING MULTIPLE IMAGES ON SINGLE FILM

BACKGROUND OF THE INVENTION

The present invention relates to a process camera for reproducing a plurality of originals on a single photosensitive member (hereinafter referred to as a "film").

Process cameras capable of reproducing multiple originals on a single film are already known from U.S. Pat. Nos. 3,998,546, 3,837,742, and 3,920,333, for example.

The conventional process cameras have a platen for holding a film, the platen being movable in X and Y directions in one plane normal to the optical axis of an object lens. Each time one page of an original has been reproduced on the film, the platen is moved in the X and Y directions and then a next page is reproduced on the film. Thereafter, necessary marks are printed on the film by contact printing on a printer. In this manner, a multiple pages of the original are successively reproduced on the film. Where the film is to be used as a direct printing plate, the plate can be completed by developing the images on the film.

The known process cameras, however, only reproduce originals on films. After the original has been reproduced on the film, a signature and other register marks are reproduced on the film by contact printing on a printer, and then the images are developed by an image developing machine. These processing steps must be carried out by manually processing the film in a dark room.

Generally, the images of an original are reproduced as full size images without magnification in a process camera. However, there are instances where the images of an original should be enlarged or reduced in size. For enlarging or reducing an image and also obtaining a full size image, it is necessary to set the optical system to suitable magnifications. The magnification m of an optical system is expressed by:

$$m = f/(u-f) = (v-f)/f$$

where f is the focal length of the object lens, u is the distance from the principal point of the lens to the object to be photographed, and v is the distance from the principal point of the lens to the image formed by the optical system. For varying the magnification, therefore, the parameter u or v should be varied. If the parameter u or v is varied with the same lens employed, the total optical path length from the object to the image is varied.

In order to reproduce an image of an original properly in a desired position on a film in a process camera, the original should properly be positioned with respect to the subject holder. One conventional practice to meet this requirement has been to provide one side edge of the original table with a plurality of register pins, define a plurality of holes or recesses in one side edge of the original or a support base to which the original is attached, and fitting or holding the holes or recesses in or against the register pins for the positioning of the original. This procedure however requires a preparatory process for defining the positioning holes or recesses in the original, and is hence complex.

Some printing plates are produced by the diffusion transfer process which utilizes a positive-positive film, e.g., a support coated with a silver halide emulsion layer and a physical development nuclei layer. In such a printing plate, the other area than an original reproduced on the printing plate is not exposed to light, and the silver halide in the unexposed area is diffused into the physical developing speck layer by the diffusion transfer developing process. As a result, metal silver is deposited, and ink would be received by the metal silver deposit, so that a non-image area outside of the printed page would be printed in black. Therefore, the non-image area outside of the printed page should be exposed to light so as to eliminate any black non-image area. The conventional process cameras, however, cannot eliminate such black non-image areas. It has been customary to remove the film from the camera after an original has been reproduced, cover the reproduced original area on the film with a mask plate, set the film in a printer, and expose the film to light for thereby eliminating any black non-image area. Since these steps have to be effected in a dark room, the entire process is tedious and time-consuming.

If a plurality of images or originals are to be reproduced on one film in a certain format, the originals have to be set in a certain orientation. Inasmuch as each original may not be directed in the same orientation, the originals may often be directed in error.

A film is in the form of a roll stored in a cartridge, and the cartridge is located in a cartridge loading unit in a process camera. The roll film is however considerably heavy, and it has been difficult for one operator to load the cartridge with the roll film stored therein into the cartridge loading unit.

In conventional process cameras, an unexposed film is manually set on the platen, or an exposed film is manually removed from the platen. Consequently, this process is poor in efficiency, and requires a lot of manual labor.

Moreover, conventional process cameras employ films with predefined pinholes or recesses. The film can be set on the platen by fitting guide pins on the platen into the pinholes or recesses. The film has to be manually set on the platen in a dark room, a procedure which is time-consuming and tedious, and is of low efficiency.

SUMMARY OF THE INVENTION

It is an object of the present invention to provide a process camera which is automatically capable of successively reproducing images in a certain format by automatically moving a platen and a mask plate according to a predetermined program.

Another object of the present invention is to provide a process camera which can vary the magnification with a relatively simple mechanism.

Still another object of the present invention is to provide a process camera which dispenses with the formation of positioning holes or recesses in an original or its support base, and which can provide exact registry with a text composed of letters and the like on an original.

Yet still another object of the present invention is to provide a process camera which can reproduce a signature or marks necessary for cutting and bookbinding in a non-image area while the film is being set in the camera after a prescribed number of originals have been reproduced on the film, and which can reproduce a signature or marks necessary for cutting and bookbinding in a non-image area while the film of the positive-positive type is being set in the camera after a prescribed number of originals have been reproduced on the film and also can automatically eliminate any black non-image area from the film.

A further object of the present invention is to provide a process camera which can prevent originals from being directed in wrong directions.

A still further object of the present invention is to provide a process camera which allows a single operator to load a heavy film cartridge with ease.

A yet further object of the present invention is to provide a process camera that can automatically, without manual intervention, set an unexposed film on a platen and remove an exposed film from the platen for image development.

A yet still further object of the present invention is to provide a process camera which is capable of automatically setting a film on a platen.

According to the present invention, there is provided a process camera comprising a subject holder for supporting one, at a time, of a plurality of originals each composed of a page or a combination of pages, an object lens, and a movable platen for mounting a photosensitive member thereon, the movable platen being associated with movable mask plates, the subject holder, the object lens, and the movable platen being successively arranged in the order named along an optical path from the subject holder toward the platen through the object lens. The originals can successively be supported on the subject holder and exposed to light to produce respective images thereof which are focused by the object lens and reproduced on the photosensitive member according to a programmed sequence.

The process camera also has a reverse mirror disposed between the subject holder and the object lens for reversing the images, the reverse mirror lying parallel to an original supporting surface of the subject holder and being movable in the direction of an optical axis of the object lens, the object lens and the reverse mirror being movable for varying image magnification and focusing the images. The magnification can be varied with a relatively simple mechanism while the subject holder and the platen are held at rest.

A movable mirror is disposed between the object lens and the platen. The movable mirror is selectively movable into a position for establishing a focusing optical system for focusing the images of the originals on the platen, a position for establishing a focusing optical system for focusing the images of the originals on the index plate, and a position for establishing a focusing optical system for focusing the image of the index plate on the subject holder. With this arrangement, it is not necessary to define positioning holes or recesses in the originals in advance, and exact registry can be gained with the text composed of letters and the like on each original.

The platen and the mask plates are movable to respective predetermined positions for photographing marks necessary for cutting and bookbinding in non-image areas on the photosensitive member after the originals have been photographed. In case the photosensitive member is of the positive-positive type, the platen and the mask plates are movable to respective predetermined positions for photographing marks necessary for cutting and bookbinding in non-image areas on the photosensitive member, and a white original is photographed in non-image areas to eliminate any black non-image areas, after the originals have been photographed. These processes can simultaneously or separately be carried out. The marks necessary for cutting and bookbinding can automatically be photographed, resulting in a simple procedure. Where the photosensitive member is of the positive-positive type, the marks necessary for cutting and bookbinding can automatically photographed in non-image areas, and any black non-image areas can automatically be eliminated.

The process camera further includes a display unit for displaying the directions of the originals to be placed on the subject holder according to a prescribed format, and photographing switches selected according to the directions of the originals placed on the subject holder. The originals will be photographed only when the selected photographing switches are properly directed. Thus, the originals are prevented from being directed in error.

The photosensitive member is stored in a cartridge which has grips on opposite sides thereof, and wheels rotatably mounted on a bottom thereof. A cartridge loading device has guide surfaces for guiding the cartridge when the cartridge is loaded. After the wheels on one side have been placed on the guide surfaces by holding one of the grips, the other grip is held and the wheels on the other side are placed on the guide surfaces. The cartridge which is heavy can easily be loaded by a single operator.

The process camera also includes a suction plate capable of attracting the photosensitive member and movable along the platen for transferring the photosensitive member to and receiving the photosensitive member from the platen, and a pair of grip rollers for receiving the exposed photosensitive member from the suction plate and feeding the photosensitive member to an image developing machine. The photosensitive member, which is unexposed, can automatically be set on the platen, and the photosensitive member, which is exposed, can also automatically be removed from the platen and delivered for an image developing process, without any manual intervention.

The process camera further includes a pinhole forming device disposed upwardly of the platen for forming a positioning pinhole in the photosensitive member while the photosensitive member is mounted on the platen. With this arrangement, the photosensitive member can automatically be set on the platen.

The positive-positive-type photosensitive member may include a member comprising a photosensitive layer and an image receiving layer which are coated on one support or separate supports and utilizing the diffusion transfer process, a direct-positive-type photosensitive member, or the like. The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 10 is a front elevational view of a photographing format on a single film.

DETAILED DESCRIPTION

Figure 1:
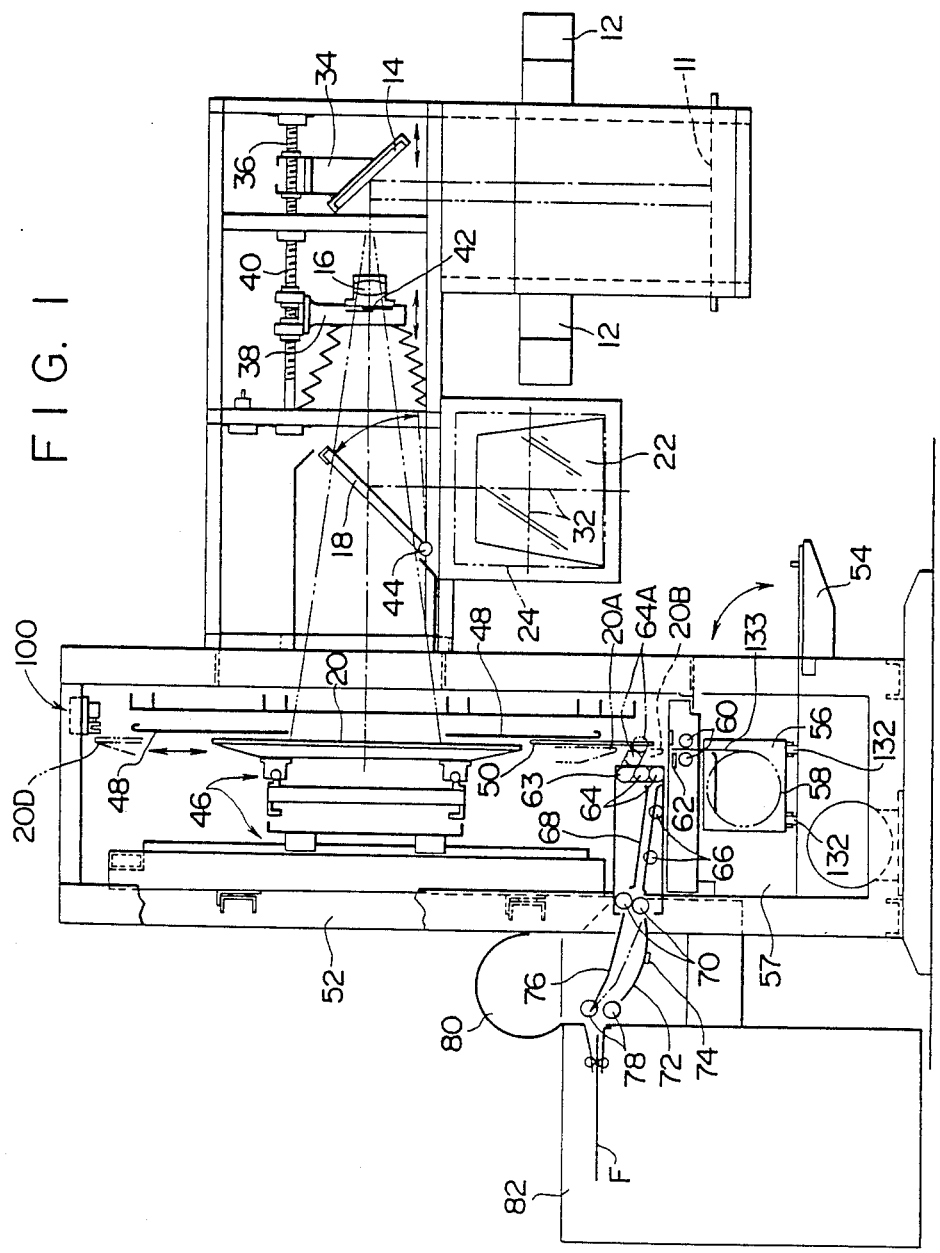
FIG. 1 is a side elevational view of a process camera according to the present invention, the view showing an internal structure of the camera.
Figure 2:
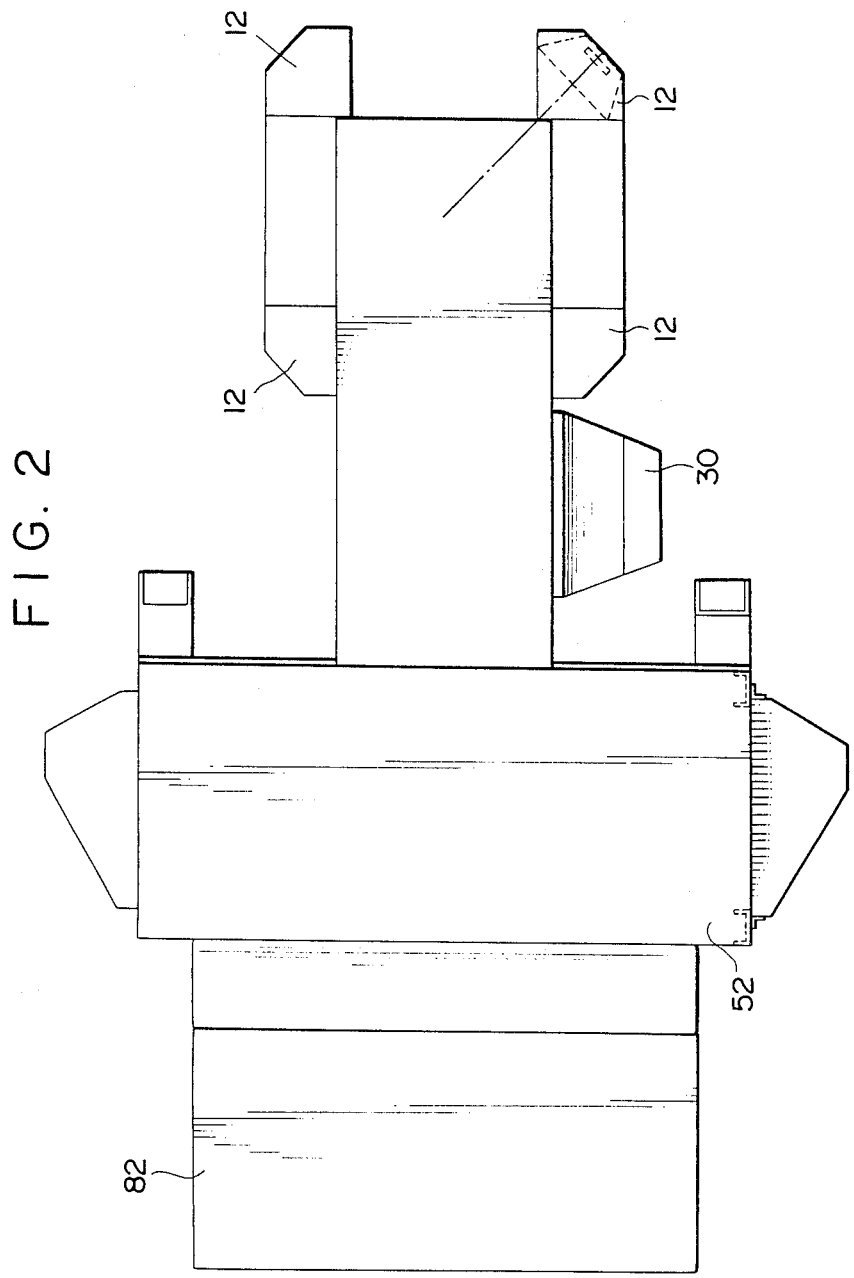
FIG. 2 is a plan view of the process camera.
Figure 3:
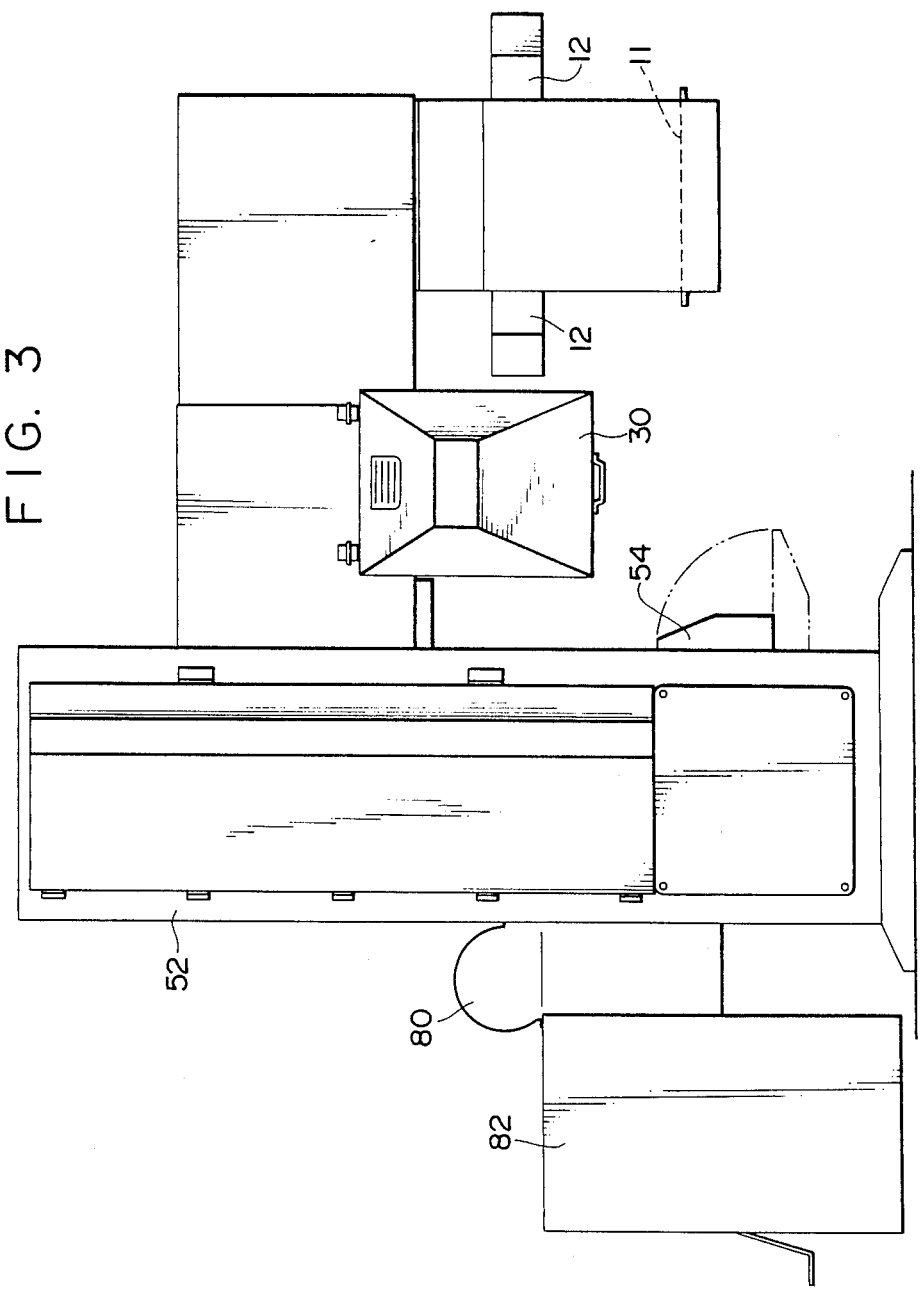
FIG. 3 is a side elevational view of the process camera.

As shown in FIGS. 1 through 4, a subject holder 11 serves to hold an original in a horizontal plane. The subject holder 11 is associated with a suction means, for example, for holding the original in position on the subject holder 11 without unwanted movement. Illuminating light sources 12 are disposed above the four corners of the subject holder 11 for illuminating the original on the subject holder 11.

A mirror 14 for bending light reflected from the original on the subject holder 11 into a horizontal direction or for reversing an image is disposed upwardly of the subject holder 11, the mirror 14 being inclined at 45°. The reverse mirror 14 is held by a holder 34 through which a horizontal feed screw 36 is threaded. The holder 34 is guided by a suitable guide means so as to be horizontally movable but nonrotatable with respect to the feed screw 36. The feed screw 36 is controlled in its rotation by a stepping motor.

An object lens 16 and a platen 20 are positioned on the path of light coming from the subject holder 11 and reflected by the reverse mirror 14, the object lens 16 and the platen 20 being disposed successively in the order named from the reverse mirror 14. The object lens 16 is supported on a holder 38 through which a feed screw 40 is threaded. To the holder 38, there is attached a shutter 42 on its side facing the platen 20. The holder 38 is guided by a suitable guide means so as to be horizontally movable but nonrotatable with respect to the feed screw 40. The rotation of the feed screw 40 is controlled by a stepping motor.

The platen 20 is disposed in a camera housing 52 for positioning a relatively large film piece F, which will be used as a film or a printing plate, in a vertical plane with an air suction device. The platen 20 can be moved in two mutually perpendicular directions, i.e., X and Y directions, in one vertical plane by means of an X/Y moving device 46. The movement of the platen 20 in the X and Y directions is carried out by rotating feed screws (not shown) about their own axes with stepping motors. A mask 48 is disposed immediately in front of the film holding surface of the platen 20. The mask 48 comprises two mask plates disposed in upper and lower positions and independently movable vertically, and other two mask plates disposed in laterally spaced positions and independently movable horizontally. The upper, lower, and lateral boundary edges of the area in which an image is to be reproduced on the film piece F are therefore defined by these four mask plates of the mask 48. The mask plates can be moved under the control of stepping motors. A vertically movable suction plate 50 is disposed in a relatively small gap between the platen 20 and the mask 48. As will be described later on, the suction plate 50 serves to attract a film piece F which has been pulled out of a cartridge 56, feed the film piece F into a position in front of the platen 20, and set the film piece F on the platen 20 under suction. After the images have been reproduced on the film piece F, the suction plate 50 attracts and lowers the film piece F into an image developing machine 82 (described later on).

Between the object lens 16 and the platen 20, there is disposed a movable mirror 18 which is angularly movable in a vertical plane about a shaft 44 into and out of the optical path of the object lens 16. The movable mirror 18 is movable between a position in which the movable mirror 18 is inclined 45° with respect to the optical axis of the object lens 16 to bend the optical path of the object lens 16 downwardly at a right angle, as shown in FIG. 1, and another position in which the movable mirror 18 is turned downwardly out of the optical path of the object lens 16.

Figure 4:
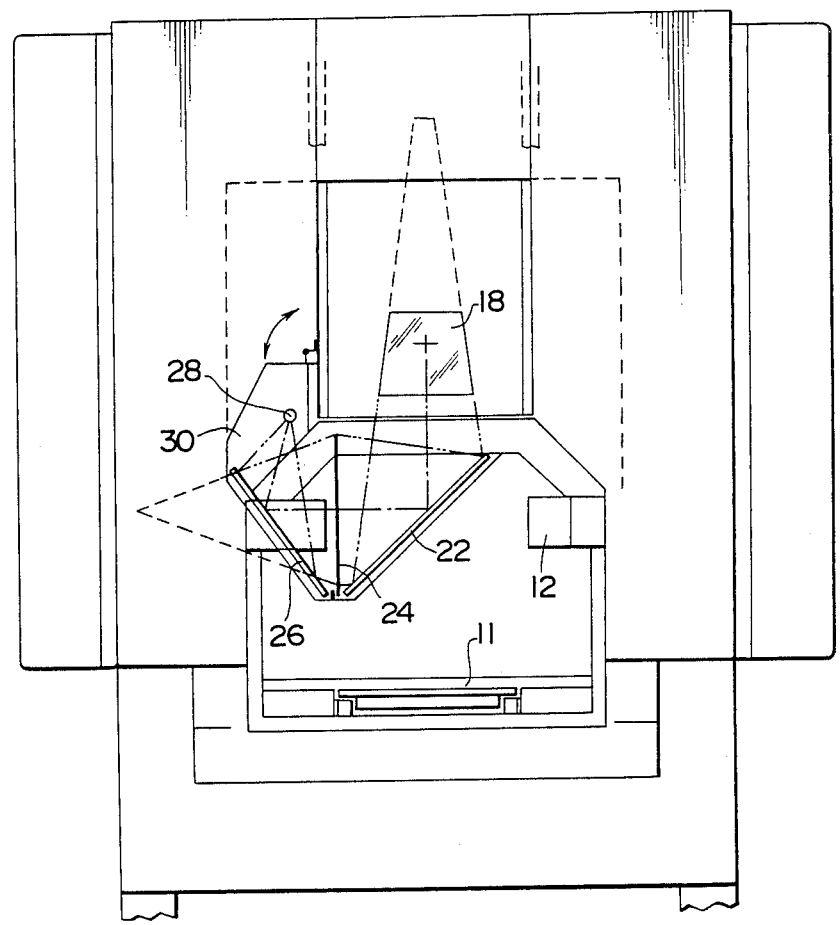
FIG. 4 is a front elevational view of an original positioning device in the process camera.

As illustrated in FIGS. 1 and 4, a mirror 22 is disposed below the movable mirror 18 in a 45°-inclined position for bending the optical path of the movable mirror 18 laterally at a right angle. An index plate 24 is vertically positioned in the optical path for light reflected from the mirror 22. When the movable mirror 18 is in the projecting position in the optical path of the object lens 16, the index plate 24 is positioned in conjugate relationship to the film holding surface of the platen 20 with respect to the movable mirror 18. As shown in FIG. 1, the index plate 24 has two mutually perpendicular central lines or cross lines 32 extending in the X and Y directions. In FIG. 4, the index plate 24 is covered with an illuminating box 30 which can be turned about a suitable shaft to open and close the index plate 24. The illuminating box 30 accommodates therein an illuminating light source 28 and an inclined mirror 26 for applying light from the light source 28 to the index plate 24. A Fresnel lens is attached to one surface of the index plate 24 and serves as a condensing lens for converging light emitted from the light source 28.

When the movable mirror 18 is retracted from the optical path of the object lens 16, there is established a focusing optical system for focusing an image of the original on the subject holder 11 onto the platen 20. When the movable mirror 18 projects in the optical path of the object lens 16, the illuminating light sources 12 for illuminating the original may be energized, and the illuminating light source 28 for illuminating the index plate 24 may be de-energized for thereby establishing a focusing optical system for focusing the original on the index plate 24. With the movable mirror 18 projecting in the optical path of the object lens 16, a focusing optical system for focusing the index plate 24 on the subject holder 11 is established by de-energizing the illuminating light sources 12 and energizing the illuminating light source 28.

Figure 6:
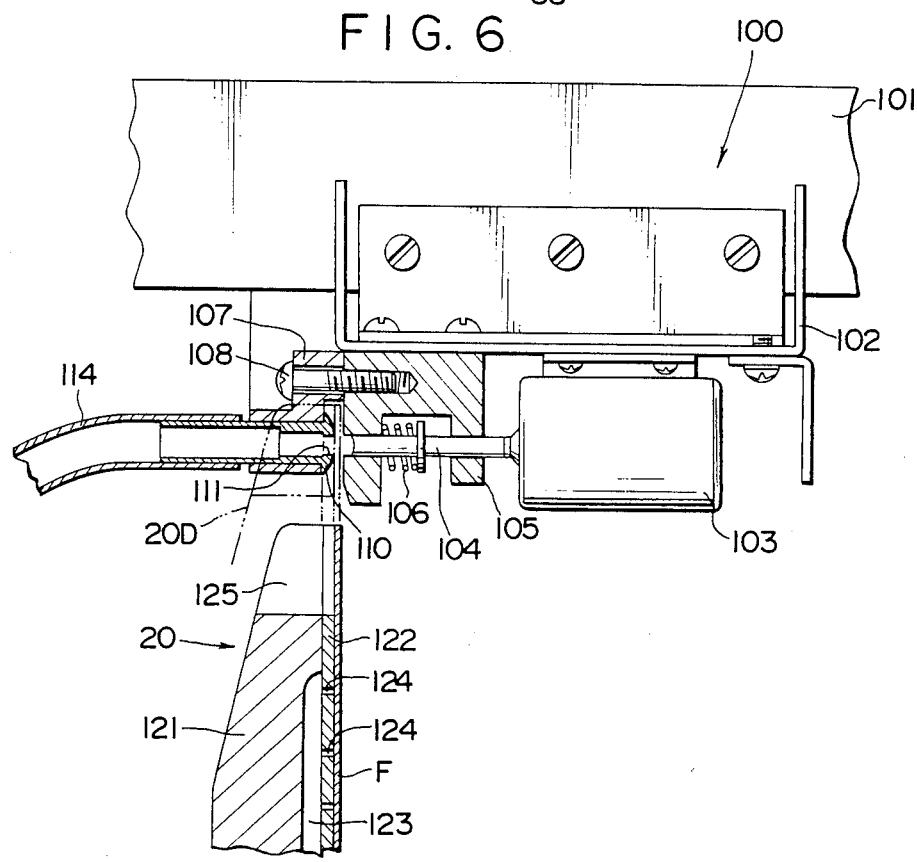
FIG. 6 is a side elevational view, partly in cross section, of a pinhole forming device in the process camera.
Figure 7:
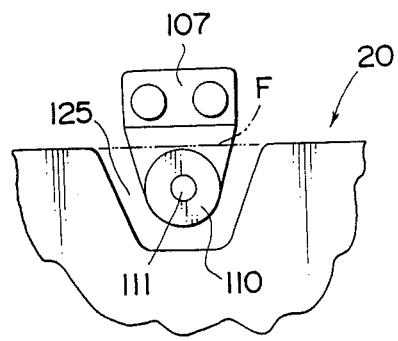
FIG. 7 is a front elevational view of the pinhole forming device.

As shown in FIG. 6, the platen 20 comprises a platen body 121 and a plate 122 fixed to the front surface of the platen body 121. The platen body 121 has an air passage 123 defined in the front surface thereof and held in communication with the air suction device. The plate 122 has a multiplicity of air holes 124 defined therein in communication with the air passage 123. The film piece F can be attracted to the front surface of the platen 20 by drawing in air through the air holes 124 and the air passage 123 with the air suction device. As also shown in FIG. 7, the platen 20 has at least two recesses 125 defined in the upper edge thereof. When the film piece F is attracted to the front surface of the platen 20, the upper edge of the film piece F covers the recesses 125.

A pinhole forming device 100 for forming positioning pinholes in the upper edge of the film piece F is disposed upwardly of the platen 20. As shown in FIGS. 6 and 7, the pinhole forming device 100 comprises an angle 102 fixed to an upper structural member 101 of the camera housing 52, a solenoid 103 fixed to the angle 102, a male cutter blade 104 actuatable by the solenoid 103, a guide 105 secured to the angle 102, and a female cutter blade 110 fastened to the guide 105 by a screw 108. The male cutter blade 104 has a tip end disposed in confronting relation to a blade edge 111 on the tip end of the female cutter blade 110 with a certain gap therebetween. The male cutter blade 104 is guided by the guide 105 so as to be slidable in a direction normal to the film holding surface of the platen 20 and is normally urged in a direction away from the female cutter blade 110. The female cutter blade 110 is in the form of a hollow cylinder having a rear end communicating with a scrap discharge pipe 114. The platen 20 can be moved upwardly of a position where the original is reproduced, as indicated by the two-dot-and-dash lines in FIGS. 1 and 2 and also shown in FIG. 7. When the platen 20 is thus moved upwardly, the female cutter blade 110 is received in one recess 125 in the platen 20, and the upper edge of the film piece F attracted to the platen 20 is inserted into the gap between the male and female cutter blades 104, 110. Then, the solenoid 103 is energized to displace the male cutter blade 104 into the blade edge 111 of the female cutter blade 110 against the resiliency of the spring 106 for thereby forming a pinhole in the film piece F under shearing forces produced when the male and female cutter blades 104, 110 engage each other.

The cartridge 56 which houses a roll film 58 is loaded in the camera housing 52 below the platen 20. The cartridge 56 can be loaded into the housing 52 by opening a cover 54 of the housing 52. After the cartridge 56 has been loaded, the cover 54 is closed to keep the interior of the housing 52 shielded from extraneous light.

Figure 8:
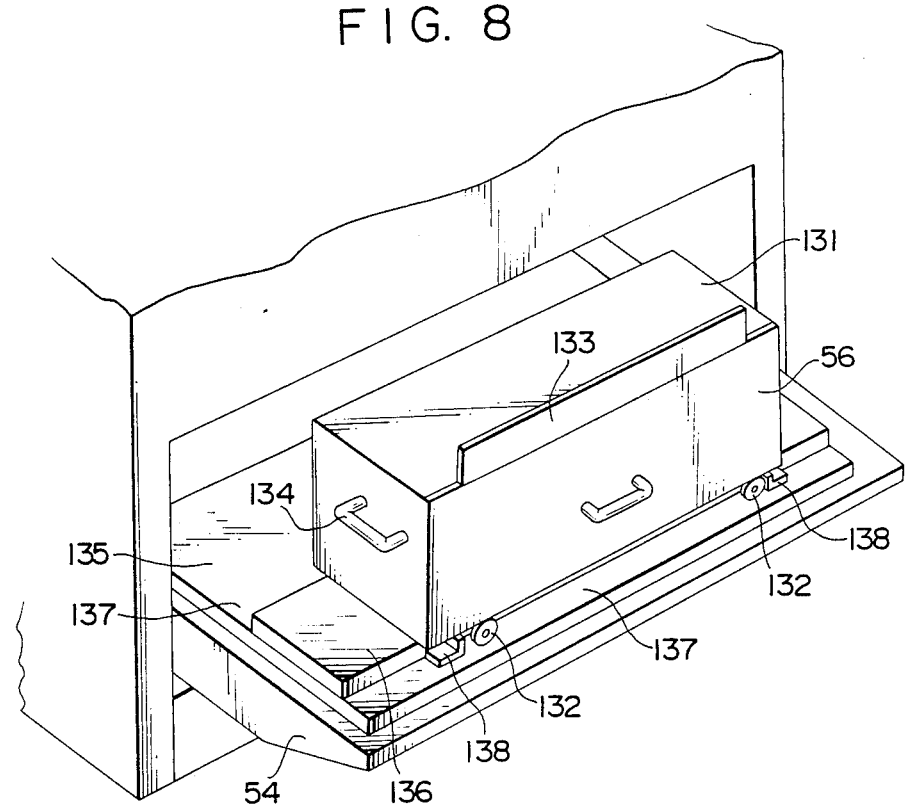
FIG. 8 is a perspective view of a film cartridge loading device in the process camera.

FIG. 8 shows the loading device for the cartridge 56 in detail. When the cover 54 is opened, it lies horizontally, and a slide plate 135 is disposed on the cover 54 so as to be slidable along the upper surface of the cover 54 back into the housing 52. The cartridge 56 can be placed on the slide plate 135. The cartridge 56 has wheels 132 at front and rear positions on opposite lateral sides of the bottom of the cartridge 56. A guide plate 136 is fixedly mounted on the top of the slide plate 135. Upper surfaces of the slide plate 135, one on each side of the guide plate 136, serve as guide surfaces 137. The front and rear wheels 132 on the cartridge 56 are positioned one on each side of the guide plate 136 for rolling movement on the guide surfaces 137. Laterally spaced stoppers 138 are fixed to the upper surfaces 137 of the slide plate 135 for engaging the wheels 132 to position the cartridge 56. The cartridge 56 has an openable/closable upper lid 131. When the lid 131 is closed, an end 133 of the stored roll film can be exposed out of the cartridge 56. Grips 134 are mounted on the lateral sides, respectively, of the cartridge 56.

For loading the cartridge 56, one of the grips 134 is held to lift one side of the cartridge 56 to place the wheels 132 on one side onto the guide surfaces 137. Then, the other grip is held to elevate the other side of the cartridge 56 and move the cartridge 56 in a direction across the opening of the housing 52 while allowing the wheels 132 on one side to roll on the guide surfaces 137. At the same time, the wheels 132 on the other side are placed on the guide surfaces 137. The cartridge 56 is then laterally positioned by bringing the wheels 132 on the opposite sides into abutting engagement with the stoppers 138. Thereafter, the cartridge 56, together with the slide plate 135, is pushed back in the housing 52 until the cartridge 56 is positioned in place in the housing 52. The loading of the cartridge 56 is finished by closing the lid 54. The cartridge 56 can be unloaded by a process which is a reversal of the above loading process.

As shown in FIG. 1, a pair of withdrawal rollers 60 is disposed above the cartridge 56 which is loaded in the housing 52, for withdrawing the end 133 of the roll film 58 which has projected from the cartridge 56. The withdrawn film is cut by a cutter 62 positioned above the withdrawal rollers 60 into a prescribed length, which will be used as the film piece F. Between the cutter 62 and the suction plate 50, there is disposed a pair of grip rollers 64 supported on a lever 63 which is swingable about a horizontal shaft. As shown in FIG. 1, the grip rollers 64 are normally retracted laterally of the suction plate 50 as indicated by the solid lines. When an exposed film piece F is to be delivered into the image developing machine 82, the grip rollers 64 are displaced into the path of movement of the suction plate 50 as indicated by the two-dot-and-dash lines 64A. When the suction plate 50 is lowered near the cutter 62 as shown in FIG. 1, the suction plate 50 can attract the film piece F fed from the rollers 60 with the air suction device and move the film piece F vertically along the film holding surface of the platen 20. The platen 20 can be moved downwardly to a position near the cutter 62 as indicated by the two-dot-and-dash lines in FIG. 1. With the plate 20 thus moved downwardly, the suction plate 50 transfers the film piece F onto the film holding surface of the platen 20. The image of an original will then be reproduced on the film piece F on the platen 20 according to a process, as described later on.

The platen 20 can be stopped in a vertically intermediate position as indicated by the two-dot-and-dash lines in FIG. 1. In this position, the suction plate 50 attracts an exposed film piece F from the platen 20. At this time, the lower end of the film piece F projects beyond the lower end of the suction plate 50. The suction plate 50 is lowered while attracting the film piece F, and transfers the lower end of the film piece F to the grip rollers 64 which have been displaced into the position 64A in FIG. 1. With the grip rollers 64 gripping the film piece F, the lever 63 is turned to move the grip rollers 64 to the solid-line position in FIG. 1 in preparation for transferring the film piece F into the image developing machine 82. Then, the grip rollers 64 are rotated about their own axes to feed the film piece F into a substantially horizontal feed passage 68 which has a plurality of guide rollers 66 therein. A pair of feed rollers 70 is disposed at the outlet end of the feed passage 68 for delivering the film piece F, which has been fed through the feed passage 68, into a temporary storage unit 72. A pair of feed rollers 78 is disposed at the outlet end of the temporary storage unit 72 for feeding the film piece F into the image developing machine 72.

The image developing machine 82 processes the film piece F at a relatively low rate, rather than a high rate, since it only suffices for the image developing machine 82 to simultaneously develop a number of images on the film piece F within the period of time required to reproduce the images on the film piece F. If a subsequent film piece F arrives while the film piece F is being processed in the image developing machine 82, such a subsequent film piece F is temporarily stored in the temporary storage unit 72. More specifically, a sensor 74 is mounted on the bottom of the temporary storage unit 72. When there is a film piece F being developed in the image developing machine 82, the feed rollers 78 are held at rest. When a next film piece F is sent into the temporary storage unit 72 while the feed rollers 78 are being stopped, the next film piece F is slackened in the temporary storage unit 72 until it is detected by the sensor 74. In response to a signal from the sensor 74, the feed rollers 70 are stopped to store the next film piece F in the temporary storage unit 72. When no film piece being processed is present in the image developing machine 82, the feed rollers 78 are rotated to feed the film piece F from the temporary storage unit 72 into the image developing machine 82. The film piece F in the temporary storage unit 72 is no longer slackened, and the sensor 74 fails to produce its signal, whereupon the feed rollers 70 are rotated again.

A switching plate 76 is angularly movably disposed on the upper portion of the temporary storage unit 72. If the film used is not suitable for image development in the image developing machine 82, e.g., if the film used is a negative film for use in a usual process whereas the image developing machine 82 is designed for developing a positive film for directly producing a printing plate, the switching plate 76 is actuated to store the exposed film fed by the rollers 70 into an escape storage unit 80 for another type of developing process.

The subject holder 11 has, on an area outside of the original supporting area, four photographing switches 141, 142, 143, 144 (FIG. 9) which double as switches for entering the direction of an original placed on the subject holder 11. The switch 141 is depressed when the original is directed upwardly, the switch 142 is depressed when the original is directed downwardly, the switch 143 is depressed when the original is directed to the right, and the switch 144 is depressed when the original is directed to the left. Although not shown, the subject holder 11 bears a crisscross mark positioned centrally on the optical axis at the time the object lens 16 and the reverse mirror 14 are positioned for photographing a full size image. The crisscross mark is used for reproducing the marks, referred to above, for cutting and bookbinding purpose. For photographing an original, the original is placed on the crisscross mark.

In the present embodiment, the magnification of the optical system can easily be varied. More specifically, by horizontally moving the reverse mirror 14, the distance between the subject holder 11 and the object lens 16 is varied to vary the magnification. At this time, the focused position is displaced off the film holding surface of the platen 20. Thus, the feed screw 40 is rotated about its own axis to move the object lens 16 along the optical axis to focus the image. The magnification is automatically varied by moving the reverse mirror 14 and the object lens 16 based on entered data on the magnification.

The stepping motors for moving the platen 20 in the X and Y directions, the stepping motor for moving the mask 48, the stepping motors for moving the object lens 16 and the reverse mirror 14, the drive source for driving the movable mirror 18, the pairs of feed rollers for feeding film pieces, the image developing machine 82, and all other movable components, are controlled by a computer according to a predetermined program. The computer has a keyboard for entering various items of data, and a display unit serving as a touch panel for entering various items of data.

Operation of the process camera thus constructed will be described below with reference to FIGS. 11 through 14.

When the power supply of the camera is turned on, initializing signals are applied to output lines to move the cutter, the mirrors, and other parts back to their preset position, and the stepping motors are returned to their original position. Then, various items of data are entered. First, a layout format is entered. The layout format is a format of reproducing or photographing originals, indicating how many the pages of originals are to be reproduced on a single film or what rows and columns originals are to be reproduced in. FIG. 10 shows one layout format by way of example. In the layout format of FIG. 10, originals are reproduced in four columns and two rows on a single film piece F, so that a total of 8 pages are reproduced on the film piece F. Then, whether the book to be produced is of a righthand or lefthand binding is selected, and plate margin data is entered. The plate margin is required for setting a printing plate on a printing press, and varies from press type to press type. Then, the type of the film used is entered. The film type data is needed for defining pinholes in the film and for focusing images on the film. Since the film thickness and hardness vary from film type to film type, the number of punching cycles of the pinhole forming device and the focusing position are determined dependent on the entered film type data. Next, magnification data is entered. In response to the entered magnification data, the object lens 16 and the reverse mirror 14 are moved to achieve the desired magnification. Then, the data of a photographing reference line is entered. The photographing reference line is a central optial axis line to be projected. The photographing reference line data indicates whether the reference line should be at a central position in a page or displaced vertically or laterally. Thereafter, the data of the width of the film used is entered, and the data of the length to which the film is reeled out of the film roll is entered. Then, the data of an exposure time is entered, and the data indicative of whether pages to be printed by the printing plate which will be formed are on back or face is also entered. Now, the sequence of entering the necessary data items is completed.

After the entry of the data items, whether there has been an input applied to the touch panel on the display unit is determined. If there is an input, then it is determined whether the input indicates that the format is to be changed, or that the operation is to be ended if it is not a format change, or that the leading end of the film is to be cut and discharged if it is not an operation end, or that the film is set if it is not film end cutting and discharging. If the operation is to be ended, the completion of film discharging is awaited, and then the power supply of the camera machine is switched off, and finally the message "TURN OFF COMPUTER POWER SUPPLY" is displayed, thus ending the operation sequence. If the leading end of the film is to be cut off and discharged, the leading end of the film is cut off into a length of 50 cm, which is thereafter discharged. The film end is cut off and discharged since when the film roll 58 is loaded in the cartridge in a bright environment, the surface of the film roll is exposed, and hence the exposed leading end of the film is to be discarded. After the film end has been cut off and discharged, control returns to the loop of awaiting a touch panel input. If the film is not set, then a touch panel input is also awaited. If the film is set, then the roll film 58 is unreeled to the input length, and cut off into a film piece F which is thereafter applied to the platen 20.

The process of unreeling the film 58, cutting the same, and applying the film piece F will be described below in greater detail. When a film setting command is issued by a touch panel input, the withdrawal rollers 60 are rotated about their own axes to pull the projecting end 133 of the roll film 58 upwardly from the cartridge 56. The film 58 goes upwardly along the film holding surface of the platen 20 which is in the lowermost position, as indicated by the two-dot-and-dash lines 20B in FIG. 1. When the upper leading end of the film is unreeled to a position near the upper end of the suction plate 50, the rollers 60 are stopped and the film is attracted to the suction plate 50. With the film thus attracted, the rollers 60 are also rotated again to elevate the suction plate 50. When the film is pulled out to a predetermined length, the ascending movement of the suction plate 50 is temporarily stopped, and the film is cut into a film piece F by the cutter 62. Thereafter, the suction plate 50 is lifted again and then stopped when the leading end of the film piece F is aligned with the upper end of the platen 20. Then, the air suction device coupled to the platen 20 is activated to enable the platen 20 to attract and hold the film piece F. The air suction device associated with the platen 20 is more powerful than the suction device coupled to the suction device 50. The film F is highly efficiently attracted to the platen 20 since the film F as unreeled from the film roll has a tendency to be coiled. As a result, the film piece F is smoothly and efficiently attracted to and held by the platen 20. Then, the suction plate 50 returns to the position shown in FIG. 1.

Figure 12:
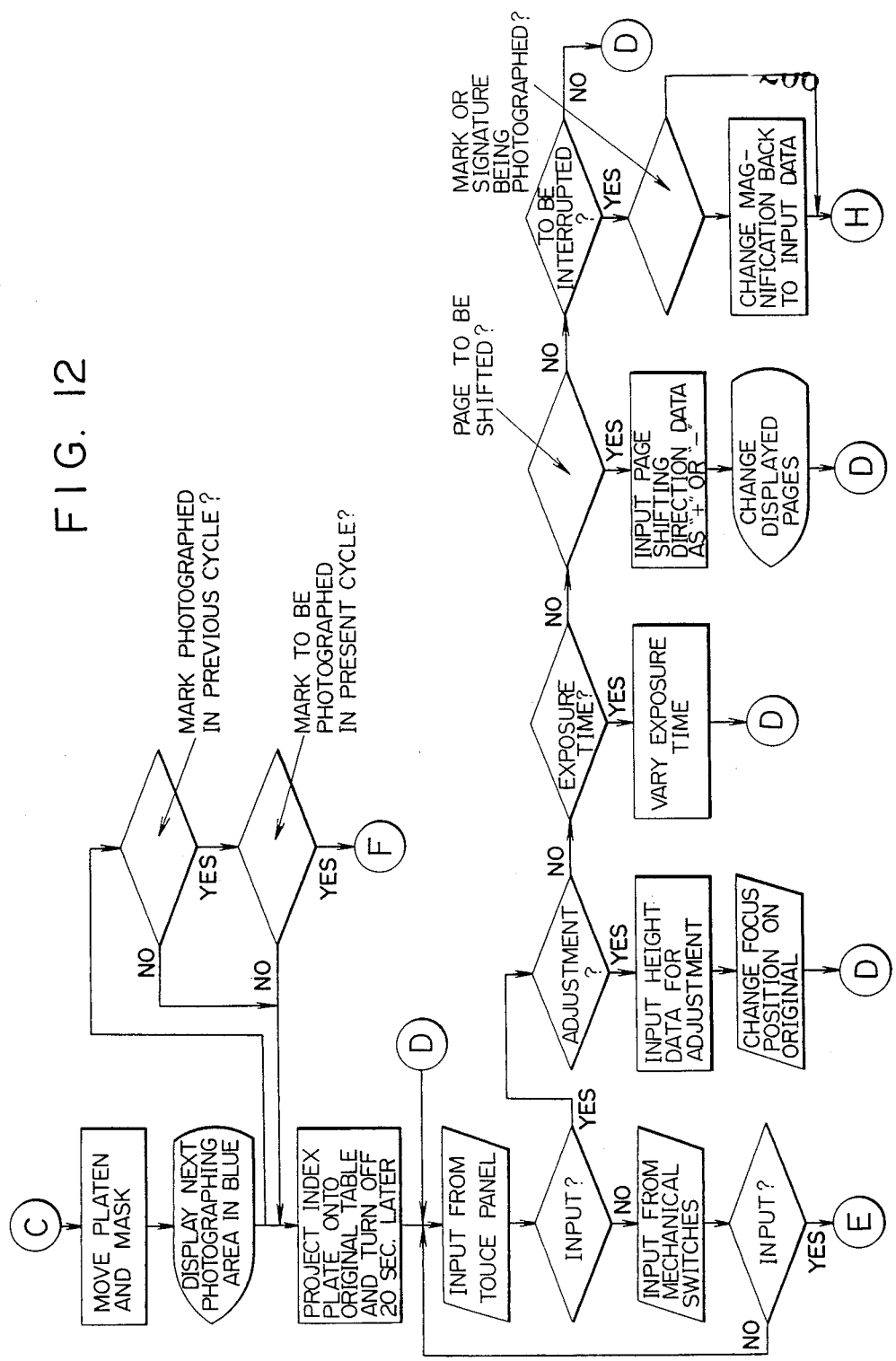

After the film piece F has been applied to the platen 20, the platen 20 and the mask 48 are moved to their prescribed position, as shown in FIG. 12, for photographing the image of the original in a prescribed position on the film piece F and for photographing a signature and marks used for cutting and bookbinding in prescribed positions on the film piece F.

Reproduction of the images of originals on the film piece F in the format shown in FIG. 10 will be described below. The images a, b, c,..., h are successively reproduced on the single film piece F in the order named. Each of the areas in which the originals are reproduced or photographed is defined by a rectangular shape indicated by the dot-and-dash line 146. Two-dot-and-dash lines 145 outside of the original image areas indicate lines along which printed sheets will be cut off. Broken lines 147 represent lines about which printed sheets will be folded on themselves. Arrows 150 indicate the directions in which the originals are oriented. The lines 146, 145 147, and the arrow 150 are not photographed on the film piece F. Non-image areas j, k where no original image is reproduced have marks 92 necessary for cutting and bookbinding, photographed therein. A non-image area i between certain two pages of original images has a signature 94 photographed therein. The marks and signature in these non-image areas i, j, k are reproduced in the order named. The film piece F on which the images and marks are reproduced in the illustrated format is then developed and used as a printing plate. The printing plate is used to print a sheet of paper in the same format as that illustrated in FIG. 10. The printed sheet is folded on itself along the lines 147 in a predetermined sequence such that the signature 94 will be positioned on the back of the folded sheet. The same format as shown in FIG. 10 is displayed on the display unit.

Figure 14:
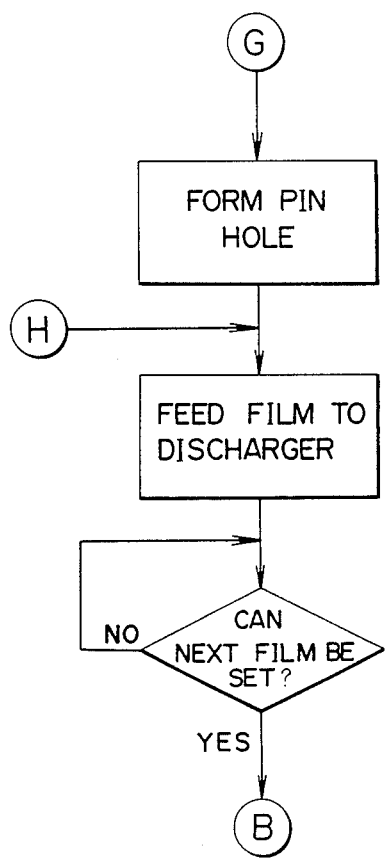

The platen 20 is moved in the X and Y directions to move the optical axis of the object lens 16 into a prescribed position in an area to be photographed. The mask plates of the mask 48 are moved individually to define the area to be photographed in the X and Y directions around the optical axis, as indicated by the arrows Ya, Yb, Xa, Xb in FIG. 10. When the platen 20 and the mask 48 are moved and positioned in this manner, the next area to be photographed is displayed in blue on the display unit. If no mark is photographed in the previous photographing cycle and also no mark is to be photographed in the present photographing cycle, then the index plate 24 is projected onto the subject holder 11, and turned off 20 seconds later. Then, a touch panel input is awaited. If there is a touch panel input, then it is determined whether the touch panel input indicates adjustment, or an exposure time if it is not adjustment, or a page shift if it is not an exposure time, or an interrupt if it is not a page shift. More specifically, adjustment is required to photograph an original having a thickness. When photographing an original having a thickness of 10 mm, for example, it would not properly focused without adjustment. Therefore, 10 mm is entered as height data for adjustment to vary the focused position of the original accordingly. Exposure time data is entered if the exposure time is to be varied. Page shift data represents the direction in which pages, as shown in FIG. 10, are to be shifted successively, the direction being expressed by "+" or "−". The pages displayed on the display unit are changed in timed relation to the page shifts. If the production of a printing plate fails, the interrupt is required to stop the process of producing the printing plate and start another producing process again. As shown in FIG. 14, if the process is to be interrupted, then the film is fed to the discharger unless marks or a signature is being photographed, or the film is fed to the discharger after the magnification is changed back to the input data when marks or a signature is being photographed.

Figure 13:
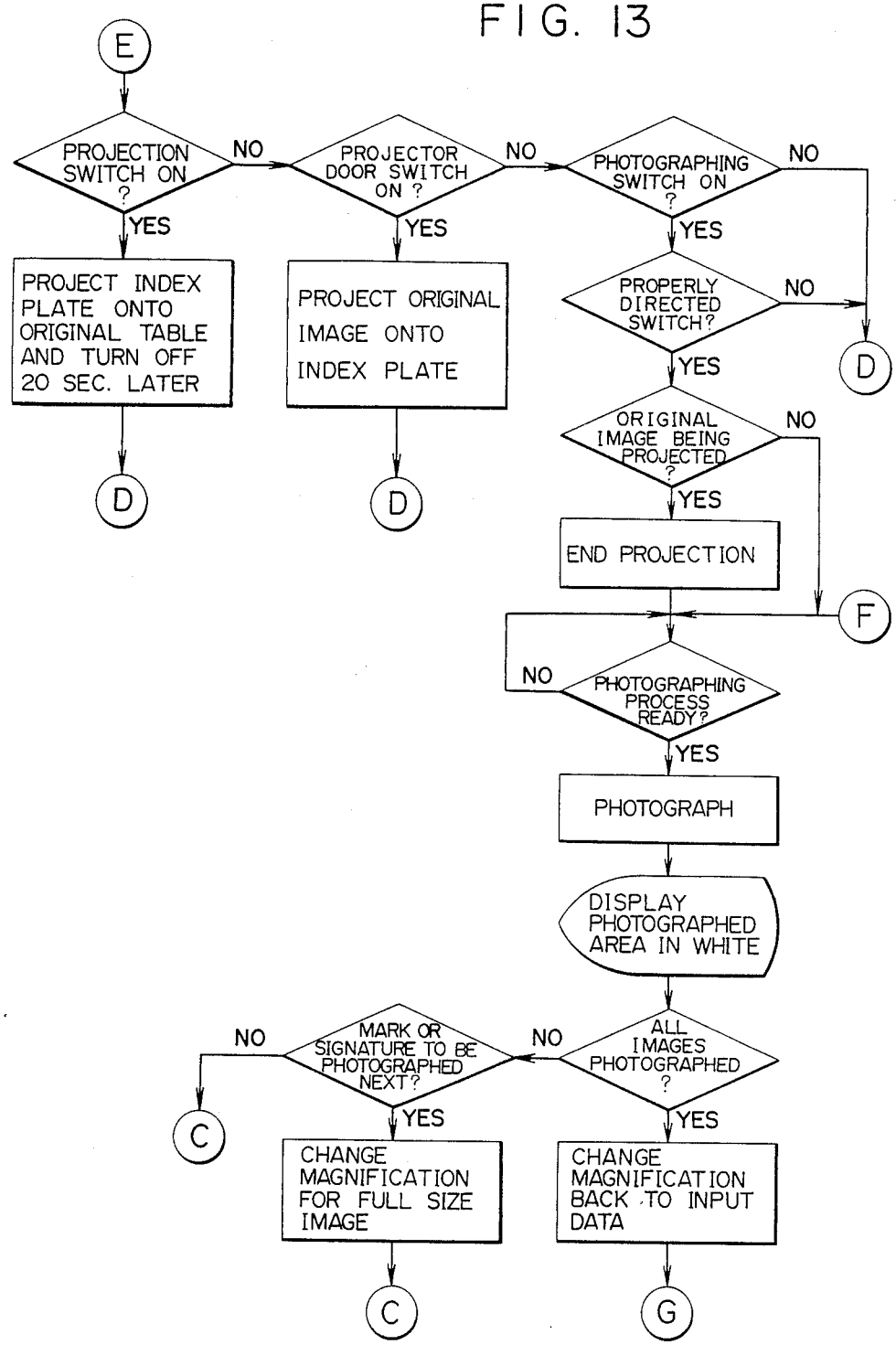

If no input is applied to the touch panel and a mechanical switch input is applied, then control goes to a photographing process as shown in FIG. 13. Mechanical switches include a projection switch, a projector door switch, and photographing switches. If the projection switch is turned on, the index plate 24 is projected onto the subject holder 11 and then turned off 20 seconds later. While the index plate 24 is being projected, the original is positioned in registry with the image of the index plate projected onto the subject holder 11.

Figure 5:
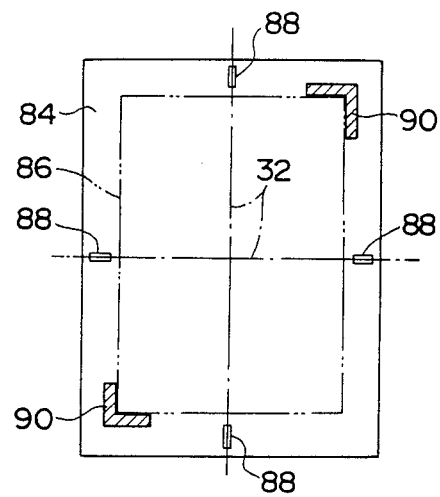
FIG. 5 is a view of an index plate onto which an original is projected.

For positioning the original, indicia are applied to the index plate 24 according to the following procedure: First, the movable mirror 18 is positioned in the optical path of the object lens 16 as shown in FIG. 1, and one original is placed on the subject holder 11. As shown in FIG. 5, the original, indicated at 84, has an image area 86 containing letters and the like and marks 88 positioned outside of the image area 86 and indicative of the centers of the image area 86 in the X and Y directions. In FIG. 5, only the outline of the image area 86 is indicated by the imaginary lines. When the illuminating light sources 12 are energized, the image of the original 84 is transmitted along the optical path comprising the reverse mirror 14, the object lens 16, the movable mirror 18, and the mirror 22, and focused on the index plate 24. The focused image on the index plate 24 can be observed from outside by opening the illuminating box 30. The original 84 is moved and positioned on the subject holder 11 so that the central marks 88 on the original 84 in the X and Y directions will be positioned on the crisscross central lines 32 on the index plate 24. The image shown in FIG. 5 is an image projected onto the index plate 24 after the original 84 has completely been positioned on the subject holder 11. After the original 84 has been positioned, indicia 90 are applied as by attaching tapes to the index plate 24 along outer peripheral edges of the image area 86 of the original 84 which has been projected onto the index plate 24. In FIG. 5, right-angled indicia 90 are applied along two diagonally opposite corners of the image area 86.

The original 84 may contain one page or a combination of plural pages.

Then, with the movable mirror 18 projecting in the optical path of the object lens 16, the illuminating light sources 12 are de-energized, the illuminating box 30 is closed, and the illuminating light source 28 is energized to project the image of the index plate 24 onto the subject holder 11 via the mirror 22, the movable mirror 18, the object lens 16, and the reverse mirror 14. Therefore, the crisscross central lines 32 and the indicia 90 are projected onto the subject holder 11. Then, the original is put on the subject holder 11, and the outer peripheral edges of the image area 86 of the original are aligned with the indicia 90 for thereby positioning the original.

The projector door switch indicated in FIG. 13 is a switch operable in response to the opening and closing of the illuminating box 30. When the illuminating box 30 is opened, the projector door switch is operated to energize the illuminating light sources 12 thereby to project the image of the original on the subject holder 11 onto the index plate 24. Then, the original is positioned and the indicia 90 are applied, as described above.

Figure 9:
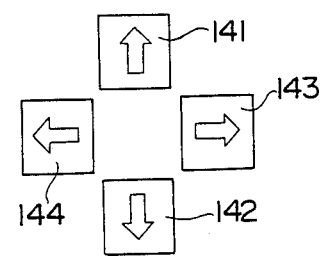
FIG. 9 is a plan view of photographing switches in the process camera.

The photographing switches referred to above with reference to FIG. 13 are the four switches 141, 142, 143, 144 shown in FIG. 9. For photographing each original according to the format shown in FIG. 10, it is necessary that each original be placed on the subject holder 11 while being properly oriented according to the indicated direction. To do this, the original is placed and positioned on the subject holder 11 while being oriented in the direction of the arrow 150 in the next area to be photographed which is displayed in blue in the display unit. Then, one of the four photographing switches 141, 142, 143, 144, which is directed in the same direction as the direction of the original on the subject holder 11, is selected and depressed. It is then determined whether the depressed photographing switch is a properly directed switch. If so, then it is determined whether the original on the subject holder 11 is being projected onto the index plate 24. If the original is being projected, then the completion of the projection process is awaited, and after it has been confirmed that a photographing process is ready, the photographing process is initiated to photograph the original on the subject holder 11 in a prescribed area on the film piece F on the platen 20. The photographing process is carried out as follows: First, the shutter 42 is closed, the movable mirror 18 is retracted out of the optical path of the object lens 16, and then the shutter 42 is opened for a preset exposure time and closed. The area which has been photographed is displayed in white on the display unit. If the depressed photographing switch is not a properly directed switch, then control returns to the step of awaits a touch panel input, and no photographing process is carried out.

It is then determined whether all images have been photographed or not. If not, then it is determined whether marks or a signature is to be photographed next or not. If not, then control returns to the process of FIG. 12 to repeat the sequence described above until a given number of originals are photographed on the film piece F in a predetermined order. Each time an image is photographed, the platen 20 is moved in the X and Y directions, and the four mask plates of the mask 48 are vertically and horizontally moved. In this manner, the images of the originals are sequentially photographed in the respective given areas on the film piece F.

After a given number of originals have been photographed, then the marks 92 necessary for cutting and bookbinding and the signature 94 are to be photographed. The object lens 16 and the reverse mirror 14 are moved for a magnification of full size image, and control goes back to the process of FIG. 12. The marks and signature are photographed in basically the same manner as the originals are photographed. However, since the marks and signature are photographed in non-image areas where no original images are reproduced, as shown in FIG. 10, the platen 20 is moved accordingly, and the mask plates of the mask 48 are moved to define areas corresponding to the non-image areas. First, the platen 20 and the mask 48 are positioned for photographing the signature 94. Then, the pattern for the signature is placed in position on the subject holder 11, and the photographing switch is depressed to photograph the signature pattern. Patterns for photographing the marks 92 on the film piece are already marked centrally on the subject holder 11. Since the marks on the subject holder 11 and the marks to be photographed on the film piece are in predetermined positions, the marks can automatically be photographed successively in the order of i, j, k according to a predetermined program.

The non-image areas in which no original image is photographed are shielded by the mask and hence not exposed to light. Where the photosensitive member is of the positive-positive type, when the marks 92 and the signature 94 are to be photographed, the patterns for the marks 92 and the signature 94 are first marked on a white original, and then photographed on the corresponding non-image areas, so that any black non-image areas will be eliminated. In this fashion, the photographed areas and the non-image areas have the same original background. The process of photographing the marks and signature, and the process of eliminating any black non-image areas may be effected in different procedures.

The magnification of the photographing optical system is set for full size images when photographing the marks 92 and the signature 94, in order to facilitate automatic photographing of the marks 92. More specifically, since the magnification is varied by moving the object lens 16 and the reverse mirror 14, varying the magnification results in a deviation of the optical axis center on the subject holder 11 due to the movement of the reverse mirror 14. Therefore, for photographing the marks 92 with a varied magnification, the patterns for the marks 92 would have to be moved into registry with the optical axis center. Where the optical system is set for the full size image magnification, however, the optical axis center remains constant at all times, and the patterns for the marks 92 may be fixedly located on the subject holder 11. This is highly suitable for automatically photographing the marks 22.

Turning back to FIG. 13, when all images have been photographed, the magnification is changed back to the input data, and control goes to a post-treatment process as shown in FIG. 14. In this post-treatment process, a pinhole is formed in the film piece by the pinhole forming device 100 illustrated in FIGS. 6 and 7. More specifically, after all images have been photographed, the platen 20 while attracting the film piece F is lifted to the position indicated by the two-dot-and-dash line 20D to cause the upper edge of the film piece F, which has been positioned in the recess 125, to be inserted between the male and female cutter blades 104, 110 of the pinhole forming device 100. Then, the solenoid 103 is energized to move the male cutter blade 104 toward the female cutter blade 110 for forming a pinhole in the film piece F under shearing forces produced when the male cutter blade 104 and the blade edge 111 of the female cutter blade 110 coact with each other. The solenoid 103 is energized in as many cycles as determined by the entered data indicating the type of the film used. Where a relatively thick film is used, the solenoid 103 is energized several times to form a pinhole without fail. Scraps formed when defining pinholes are discharged out of the camera through the discharge pipe 114.

Inasmuch as a pinhole is defined in the film piece F attracted to the platen 20 after all images have been photographed, the film piece can highly advantageously be set automatically on the platen 20.

In FIG. 14, after the pinholes have been defined, the film is sent to the discharger. The film is discharged by lowering the platen 20, transferring the film onto the suction plate 50, lowering the suction plate 50, and rotating and swinging the grip rollers 64. Thereafter, the images on the film piece are developed by the image developing machine 82. After the film piece has been discharged, and as soon as a next film piece can be set in place, control goes to the step of awaiting a touch panel input shown in FIG. 11, and then the process described above is repeated.

Figure 11:
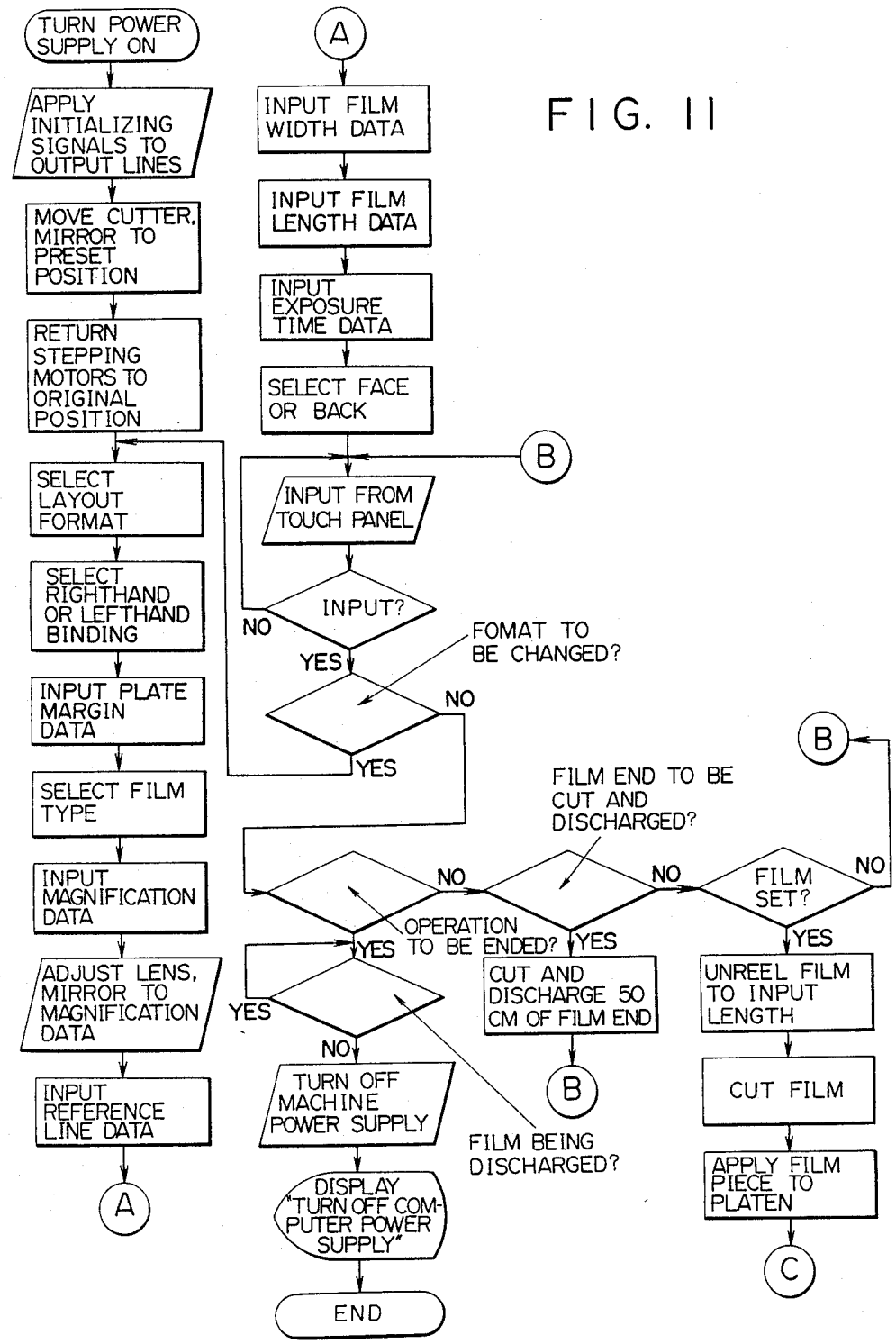
FIGS. 11 through 14 are a flowchart of an operation sequence of the process camera.

When the entire process is completed, an operation end is entered as a touch panel input as shown in FIG. 11. If a film piece is being discharged at this time, the completion of the film discharging step is awaited, and then the power supply of the camera machine is turned off. Then, the message "TURN OFF COMPUTER POWER SUPPLY" is displayed on the display unit, whereupon the operation is ended Although a certain preferred embodiment has been shown and described, it should be understood that many changes and modifications may be made therein without departing from the scope of the appended claims.

What is claimed is:

1. A process camera comprising:
a subject holder for supporting one, at a time, of a plurality of originals each composed of a page or a combination of pages;
an object lens;
a movable platen for mounting a photosensitive member thereon, said movable platen being associated with movable mask plates, said subject holder, said object lens, and said movable platen being successively arranged in the order named along an optical path from said subject holder toward said platen through said object lens; and
the arrangement being such that said originals can successively be supported on said subject holder and exposed to light to produce respective images thereof which are focused by said object lens and reproduced on said photosensitive member according to a programmed sequence.

2. A process camera according to claim 1, further including a reverse mirror disposed between said subject holder and said object lens for reversing the images, said reverse mirror being movable parallel to an original supporting surface of said subject holder and being movable in the direction of an optical axis of said object lens, said object lens and said reverse mirror being movable for varying image magnification and focusing the images.

3. A process camera according to claim 1, further including a movable mirror disposed between said object lens and said platen and movable into and out of an optical path of said object lens;
an index plate positioned in conjugate relationship to a photosensitive member supporting surface of said platen with respect to said movable mirror when said movable mirror projects into said optical path of the object lens;
an illuminating light source for illuminating said index plate; and
said movable mirror being selectively movable into a position for establishing a focusing optical system for focusing the images of the originals on said platen, a position for establishing a focusing optical system for focusing the images of the originals on said index plate, and a position for establishing a focusing optical system for focusing the image of said index plate on said subject holder.

4. A process camera according to claim 1, wherein said platen and said mask plates are movable to respective predetermined positions for photographing marks necessary for cutting and bookbinding in non-image areas on the photosensitive member after said originals have been photographed, and wherein in case said photosensitive member is of the positive-positive type, said platen and said mask plates are movable to respective predetermined positions for photographing marks necessary for cutting and bookbinding in non-image areas on the photosensitive member, and a white original is photographed in non-image areas to eliminate any black non-image areas, after said originals have been photographed.

5. A process camera according to claim 1, or 4, further including a display unit for displaying the directions of the originals to be placed on said subject holder according to a prescribed format, and photographing switches selected according to the directions of the originals placed on said subject holder, the arrangement being such that the originals will be photographed only when the selected photographing switches are properly directed.

6. A process camera according to claim 1, further including a cartridge for storing said photosensitive member, said cartridge having grips on opposite sides thereof and wheels rotatably mounted on a bottom thereof, and a cartridge loading device including guide surfaces for guiding said cartridge when the cartridge is loaded, the arrangement being such that after the wheels on one side have been placed on said guide surfaces by holding one of said grips, the other grip is held and the wheels on the other side are placed on said guide surfaces.

7. A process camera according to claim 1, further including a suction plate capable of attracting said photosensitive member and movable along said platen for transferring the photosensitive member to and receiving the photosensitive member from said platen; and
- a pair of grip rollers for gripping and feeding said photosensitive member, said grip rollers being movable between a position for transferring the photosensitive member which is unexposed to said platen via said suction plate and a position for receiving the photosensitive member which is exposed from said platen via said suction plate and for feeding the received photosensitive member to an image developing machine.

8. A process camera according to claim 1, further including a pinhole forming device disposed upwardly of said platen for forming a positioning pinhole in said photosensitive member while the photosensitive member is mounted on said platen.

* * * * *